(12) United States Patent
Schneider et al.

(10) Patent No.: US 9,647,291 B2
(45) Date of Patent: May 9, 2017

(54) HEATER AND SUPPORTING STRUCTURE THEREOF

(71) Applicant: DELPHI TECHNOLOGIES, INC., Troy, MI (US)

(72) Inventors: Jonathan R. Schneider, Lake Orion, MI (US); Karl J. Haltiner, Jr., Fairport, NY (US); Bernhard A. Fischer, Honeoye Falls, NY (US); Charles J. Badura, Penfield, NY (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 724 days.

(21) Appl. No.: 14/013,838

(22) Filed: Aug. 29, 2013

(65) Prior Publication Data
US 2015/0064594 A1   Mar. 5, 2015

(51) Int. Cl.
| | |
|---|---|
| *H01M 8/24* | (2016.01) |
| *H01M 8/2465* | (2016.01) |
| *E21B 36/00* | (2006.01) |
| *H01M 8/2475* | (2016.01) |
| *H01M 8/249* | (2016.01) |
| *H01M 8/04089* | (2016.01) |
| *H01M 8/04082* | (2016.01) |
| *E21B 43/24* | (2006.01) |

(Continued)

(52) U.S. Cl.
CPC ........... *H01M 8/2465* (2013.01); *E21B 36/00* (2013.01); *E21B 36/008* (2013.01); *E21B 43/24* (2013.01); *H01M 8/04089* (2013.01); *H01M 8/04201* (2013.01); *H01M 8/249* (2013.01); *H01M 8/2475* (2013.01); *E21B 41/0085* (2013.01); *H01M 8/0618* (2013.01); *H01M 8/0662* (2013.01); *H01M 2008/1293* (2013.01); *H01M 2250/405* (2013.01); *Y02B 90/16* (2013.01)

(58) Field of Classification Search
CPC ...... H01M 8/2465–8/249; E21B 36/00–36/04; E21B 4/0085; E21B 41/0085
USPC ........................................................ 429/458
See application file for complete search history.

(56) References Cited

U.S. PATENT DOCUMENTS

| | | |
|---|---|---|
| 6,684,948 B1 | 2/2004 | Savage |
| 6,720,099 B1 | 4/2004 | Haltiner, Jr. |

(Continued)

OTHER PUBLICATIONS

"Phase 1 Report, Geothermic Fuel Cell In-Situ Applications for Recovery of Unconventional Hydrocarbons"; Independent Energy Partners; Geothermic Fuels Cells: Phase 1 Report.

*Primary Examiner* — Jonathan G Leong
(74) *Attorney, Agent, or Firm* — Joshua M. Haines

(57) ABSTRACT

A heater includes a heater housing with a support plate secured to one end. A fuel cell stack assembly is disposed within the heater housing and includes a plurality of fuel cells which convert chemical energy from a fuel into heat and electricity through a chemical reaction with an oxidizing agent. The fuel cell stack assembly includes a fuel cell manifold for receiving the fuel and distributing the fuel to the plurality of fuel cells and for receiving the oxidizing agent and distributing the oxidizing agent to the plurality of fuel cells. A fuel supply conduit supplies the fuel to the fuel cell manifold and an oxidizing agent supply conduit supplies the oxidizing agent to the fuel cell manifold. The fuel cell stack assembly is supported on the support plate by one of the fuel supply conduit and the oxidizing agent supply conduit.

12 Claims, 12 Drawing Sheets

(51) Int. Cl.
  *E21B 41/00*    (2006.01)
  *H01M 8/0612*   (2016.01)
  *H01M 8/0662*   (2016.01)
  *H01M 8/124*    (2016.01)

(56)           References Cited

U.S. PATENT DOCUMENTS

| | | |
|---|---|---|
| 7,182,132 B2 | 2/2007 | Savage |
| 2001/0049039 A1 | 12/2001 | Haltiner, Jr. |
| 2004/0200605 A1 | 10/2004 | Yoshida et al. |
| 2004/0229096 A1 | 11/2004 | Standke et al. |
| 2006/0147771 A1 | 7/2006 | Russell et al. |
| 2007/0048685 A1 | 3/2007 | Kuenzler et al. |
| 2007/0099049 A1* | 5/2007 | Knight .............. H01M 8/04007<br>429/414 |
| 2010/0163226 A1 | 7/2010 | Zornes |
| 2012/0094201 A1 | 4/2012 | Haltiner, Jr. et al. |

\* cited by examiner

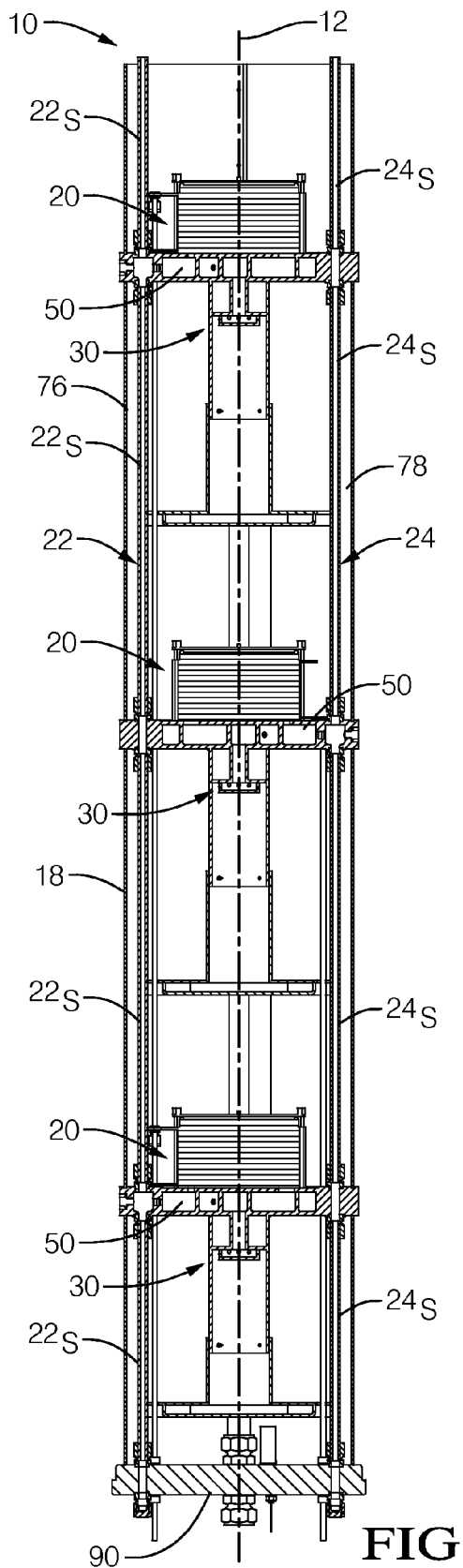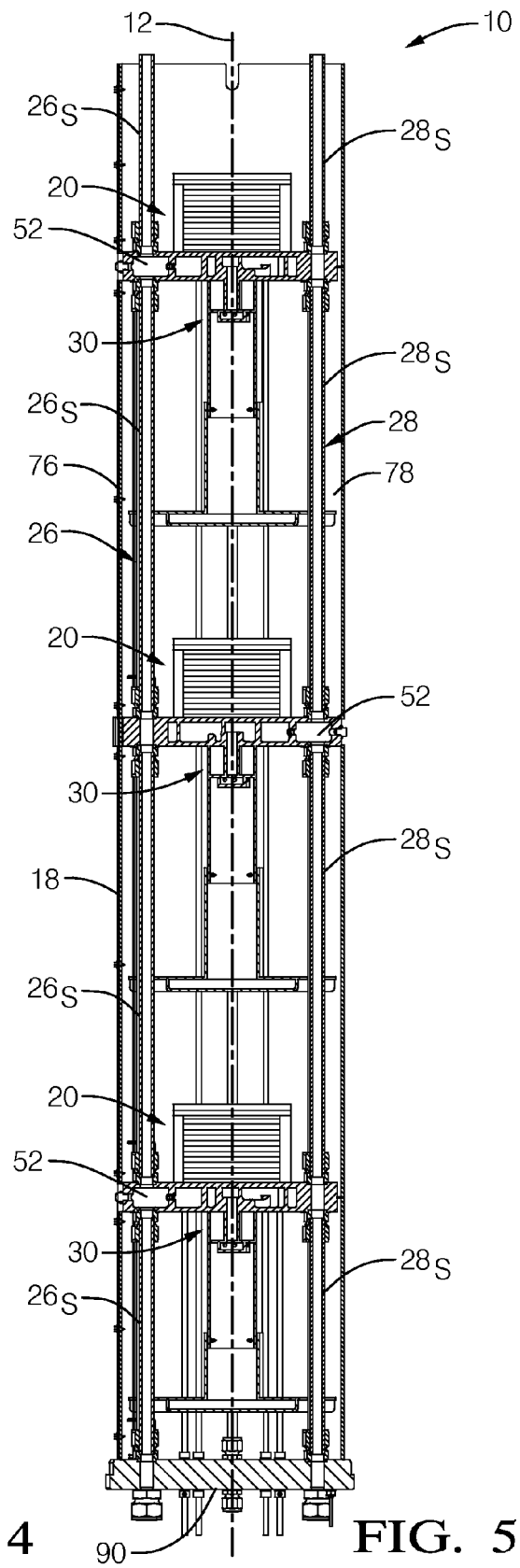

HEATER AND SUPPORTING STRUCTURE THEREOF

TECHNICAL FIELD OF INVENTION

The present invention relates to a heater which uses fuel cell stack assemblies as a source of heat; more particularly to such a heater which is positioned within a bore hole of an oil containing geological formation in order to liberate oil therefrom; even more particularly to such a heater in which the fuel cell stack assemblies are located within a heater housing; and still even more particularly to such a heater in which the fuel cell stack assemblies are supported within the heater housing by conduits which supply fuel and air to the fuel cell stack assemblies.

BACKGROUND OF INVENTION

Subterranean heaters have been used to heat subterranean geological formations in oil production, remediation of contaminated soils, accelerating digestion of landfills, thawing of permafrost, gasification of coal, as well as other uses. Some examples of subterranean heater arrangements include placing and operating electrical resistance heaters, microwave electrodes, gas-fired heaters or catalytic heaters in a bore hole of the formation to be heated. Other examples of subterranean heater arrangements include circulating hot gases or liquids through the formation to be heated, whereby the hot gases or liquids have been heated by a burner located on the surface of the earth. While these examples may be effective for heating the subterranean geological formation, they may be energy intensive to operate.

U.S. Pat. Nos. 6,684,948 and 7,182,132 propose subterranean heaters which use fuel cells as a more energy efficient source of heat. The fuel cells are disposed in a heater housing which is positioned within the bore hole of the formation to be heated. The fuel cells convert chemical energy from a fuel into heat and electricity through a chemical reaction with an oxidizing agent. U.S. Pat. Nos. 6,684,948 and 7,182,132 illustrate strings of fuel cells that may be several hundred feet in length. Operation of the fuel cells requires fuel and air to be supplied to each of the fuel cells and spent fuel (anode exhaust) and spent air (cathode exhaust) must be exhausted from each of the fuel cells. In order to do this, a fuel supply conduit and an air supply conduit are provided such that each extends the entire length of the string of fuel cells to supply fuel and air to each of the fuel cells. Similarly, an anode exhaust conduit and a cathode exhaust conduit are provided such that each extends the entire length of the string of fuel cells to expel anode exhaust and cathode exhaust from each of the fuel cells to the surface (e.g., the top of the bore hole of the formation).

The fuel supply conduits and air supply conduits of U.S. Pat. Nos. 6,684,948 and 7,182,132 are formed by openings in stamped sheets which are stacked together to form a continuous stack of fuel cells for the entire length of the heater housing. Consequently, the stamped sheets serve as the structure for supporting the fuel cells within the heater housing. However; it may be desirable to suspend individual fuel cell stack assemblies within the heater housing. When individual fuel cell stacks are suspended within the heater housing, a different approach is needed to support the fuel cell stacks within the heater housing.

What is needed is a heater which minimizes or eliminates one of more of the shortcomings as set forth above.

SUMMARY OF THE INVENTION

A heater includes a heater housing extending along a heater axis and having a first end and a second end with a support plate secured to the second end. A fuel cell stack assembly is disposed within the heater housing and includes a plurality of fuel cells which convert chemical energy from a fuel into heat and electricity through a chemical reaction with an oxidizing agent. The fuel cell stack assembly includes a fuel cell manifold for receiving the fuel and distributing the fuel to the plurality of fuel cells and for receiving the oxidizing agent and distributing the oxidizing agent to the plurality of fuel cells. A fuel supply conduit is provided in fluid communication with the fuel cell manifold for communicating the fuel to the fuel cell manifold for distribution to the plurality of fuel cells and an oxidizing agent supply conduit is provided in fluid communication with the fuel cell manifold for communicating the oxidizing agent to the fuel cell manifold for distribution to the plurality of fuel cells. The fuel cell stack assembly is supported on the support plate by one of the fuel supply conduit and the oxidizing agent supply conduit which thereby provides a support column for the fuel cell stack assembly.

BRIEF DESCRIPTION OF DRAWINGS

This invention will be further described with reference to the accompanying drawings in which:

FIG. 4 is an axial cross-sectional view of the heater of FIGS. 1 and 3 taken through section line 4-4;

FIG. 5 is an axial cross-sectional view of the heater of FIGS. 1 and 3 taken through section line 5-5;

DETAILED DESCRIPTION OF INVENTION

Figure 1:
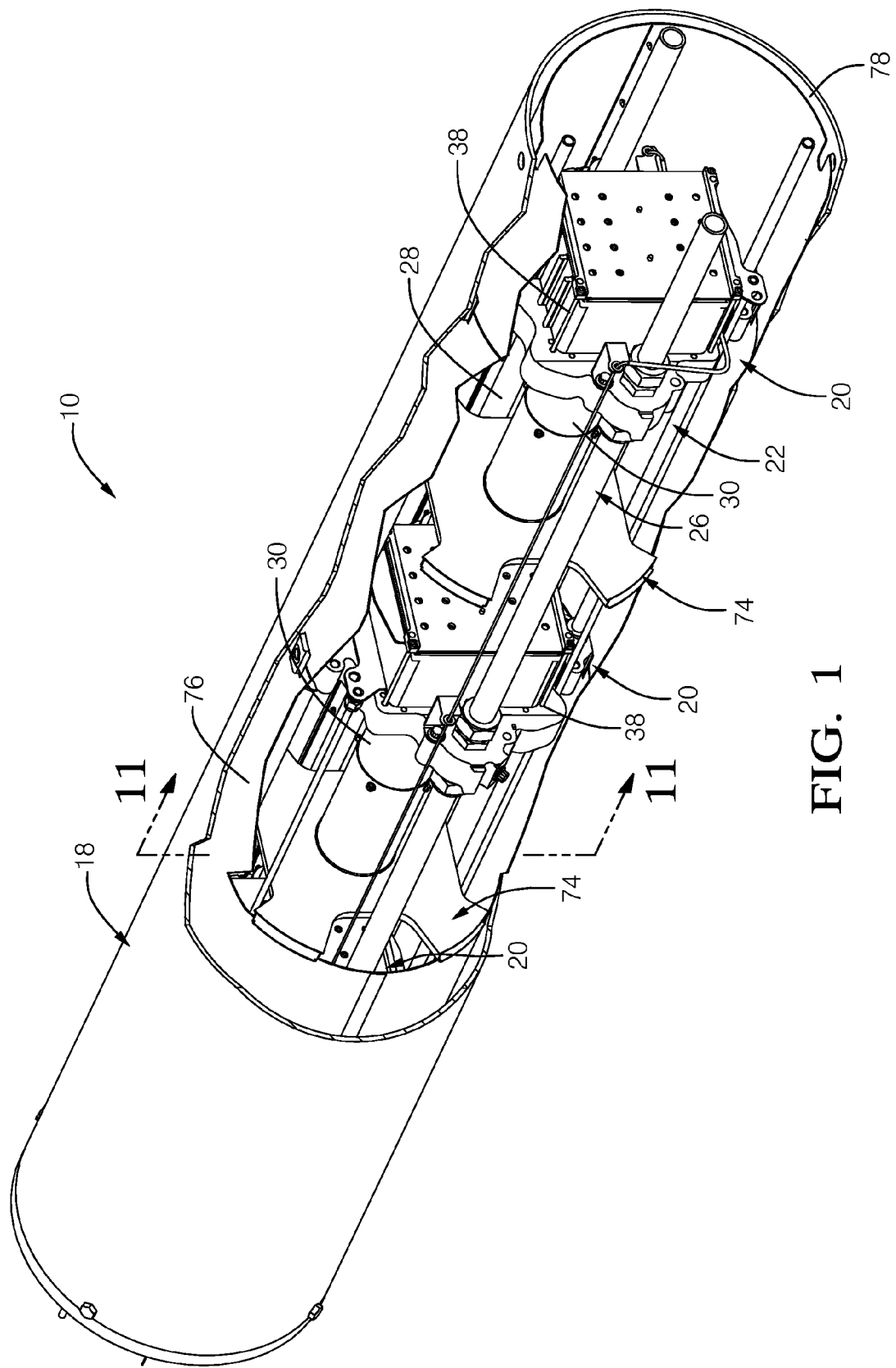
FIG. 1 is an isometric partial cross-sectional view of a heater in accordance with the present invention.
Figure 2:
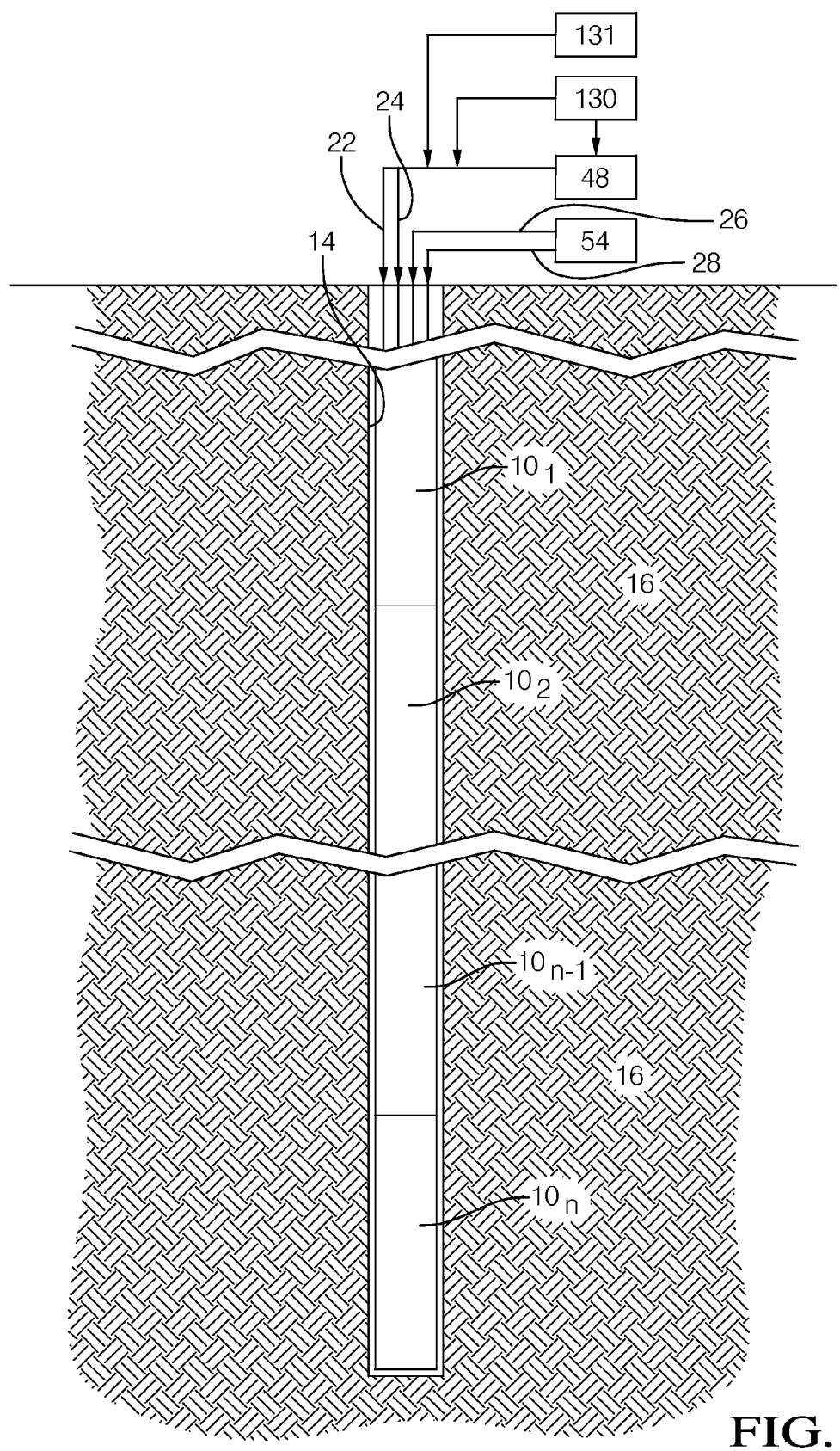
FIG. 2 is view of a plurality of heaters of FIG. 1 shown in a bore hole of a geological formation.
Figure 3:
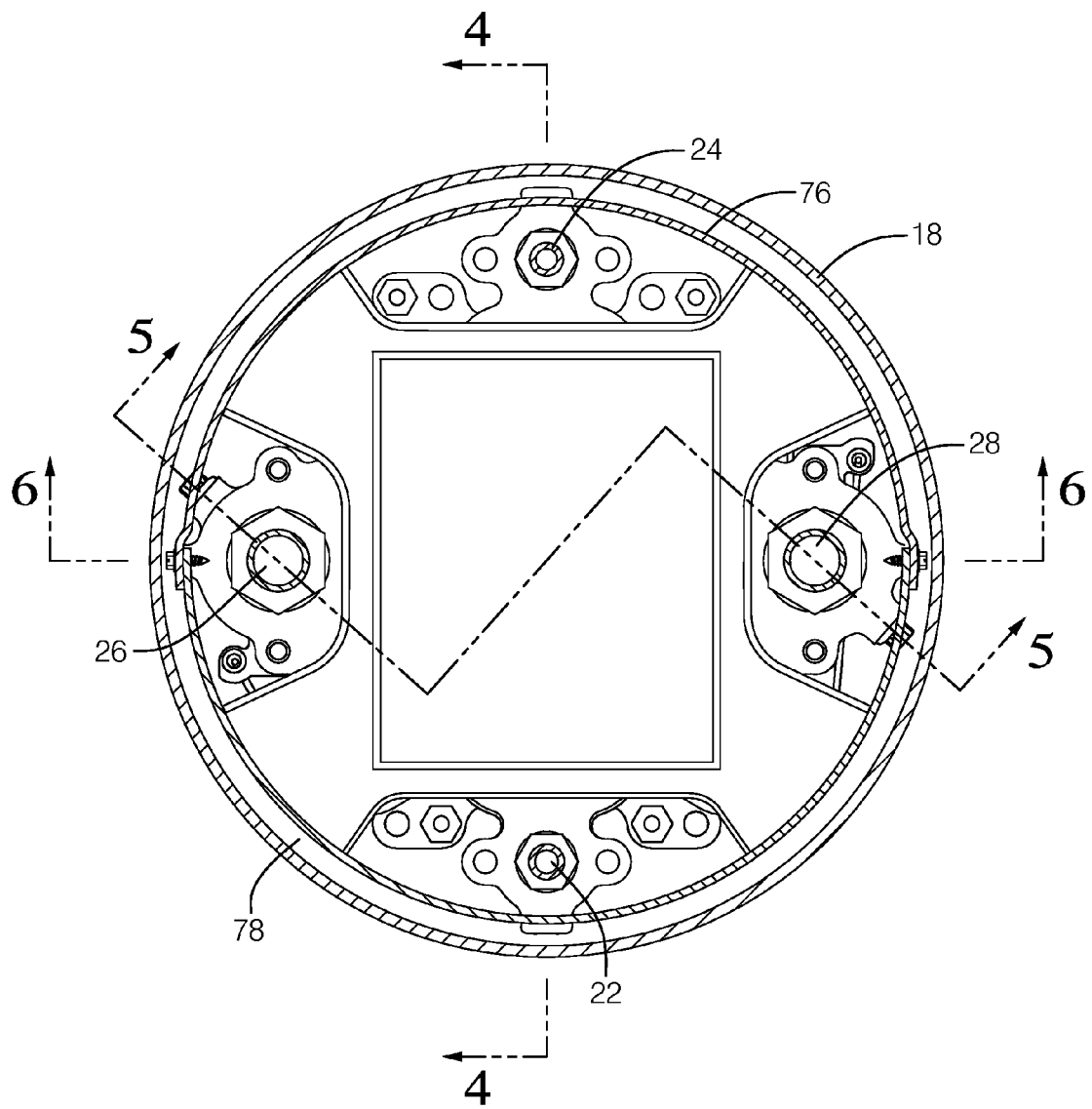
FIG. 3 is an end view of the heater of FIG. 1.

Referring now to the drawings wherein like reference numerals are used to identify identical components in the various views, a heater 10 extending along a heater axis 12 is shown in accordance with the present invention. A plurality of heaters $10_1$, $10_2$, ... $10_{n-1}$, $10_n$, where n is the total number of heaters 10, may be connected together end to end within a bore hole 14 of a formation 16, for example, an oil containing geological formation, as shown in FIG. 2. Bore hole 14 may be only a few feet deep; however, may typically be several hundred feet deep to in excess of one thousand feet deep. Consequently, the number of heaters 10 needed may range from 1 to several hundred. It should be noted that the oil containing geological formation may begin as deep as one thousand feet below the surface and consequently, heater $10_1$ may be located sufficiently deep within bore hole 14 to be positioned near the beginning of the oil containing geological formation. When this is the case, units without active heating components may be positioned from the surface to heater $10_1$ in order to provide plumbing, power leads, and instrumentation leads to support and supply fuel and air to heaters $10_1$ to $10_n$, as will be discussed later.

Heater 10 generally includes a heater housing 18 extending along heater axis 12, a plurality of fuel cell stack assemblies 20 located within said heater housing 18 such that each fuel cell stack assembly 20 is spaced axially apart from each other fuel cell stack assembly 20, a first fuel supply conduit 22 and a second fuel supply conduit 24 for supplying fuel to fuel cell stack assemblies 20, a first oxidizing agent supply conduit 26 and a second oxidizing agent supply conduit 28; hereinafter referred to as first air supply conduit 26 and second air supply conduit 28; for supplying an oxidizing agent, for example air, to fuel cell stack assemblies 20, and a plurality of combustors 30 for combusting exhaust constituents produced by fuel cell stack assemblies 20. While heater 10 is illustrated with 3 fuel cell stack assemblies 20 within heater housing 18, it should be understood that a lesser number or a greater number of fuel cell stack assemblies 20 may be included. The number of fuel cell stack assemblies 20 within heater housing 18 may be determined, for example only, by one or more of the following considerations: the length of heater housing 18, the heat output capacity of each fuel cell stack assembly 20, the desired density of fuel cell stack assemblies 20 (i.e. the number of fuel cell stack assemblies 20 per unit of length), and the desired heat output of heater 10. The number of heaters 10 within bore hole 14 may be determined, for example only, by one or more of the following considerations: the depth of formation 16 which is desired to be heated, the location of oil within formation 16, and the length of each heater 10.

Heater housing 18 may be substantially cylindrical and hollow. Heater housing 18 may support fuel cell stack assemblies 20 within heater housing 18 as will be described in greater detail later. Heater housing 18 of heater $10_x$, where x is from 1 to n where n is the number of heaters 10 within bore hole 14, may support heaters $10_{x+1}$ to $10_n$ by heaters $10_{x+1}$ to $10_n$ hanging from heater $10_x$. Consequently, heater housing 18 may be made of a material that is substantially strong to accommodate the weight of fuel cell stack assemblies 20 and heaters $10_{x+1}$ to $10_n$. The material of heater housing 18 may also have properties to withstand the elevated temperatures, for example 600° C. to 900° C., as a result of the operation of fuel cell stack assemblies 20 and combustors 30. For example only, heater housing 18 may be made of a 300 series stainless steel with a wall thickness of 3/16 of an inch.

Figure 6:
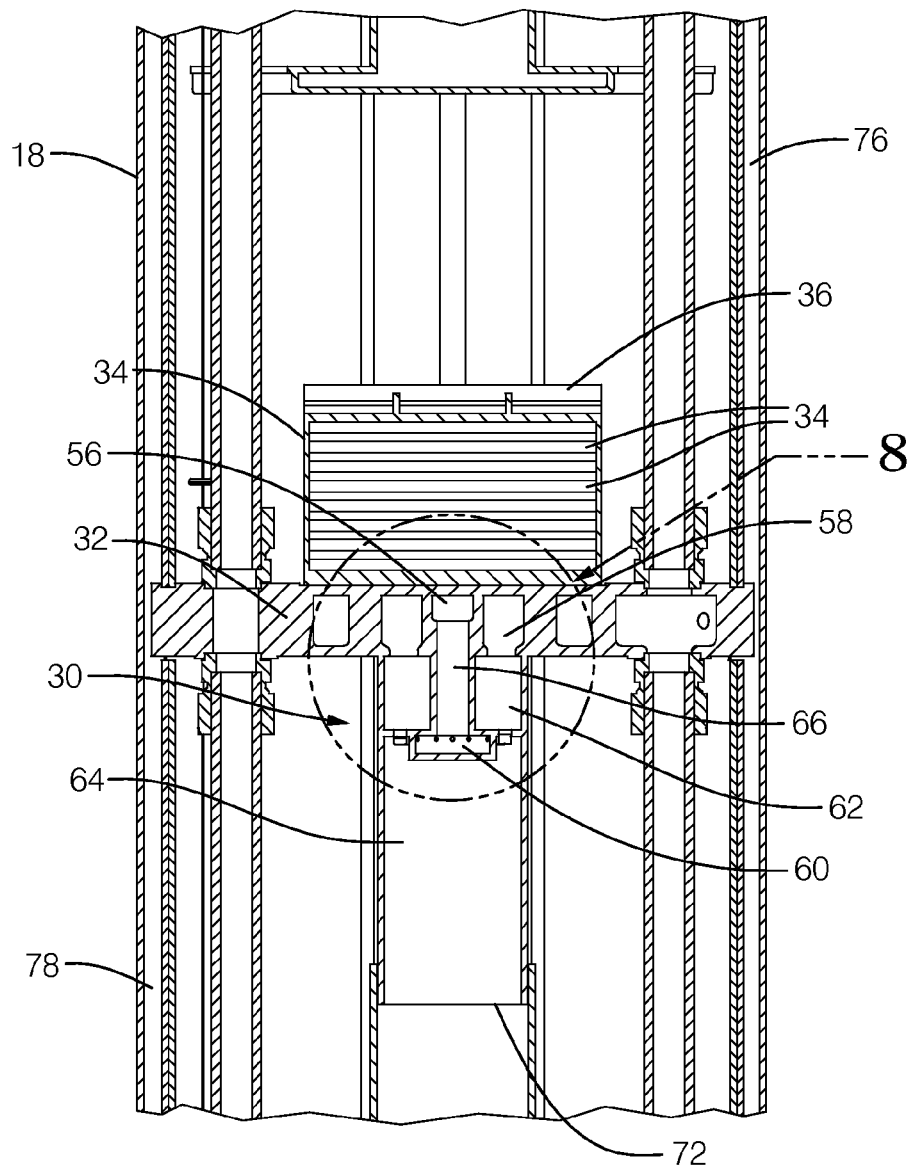
FIG. 6 is an axial cross-sectional view of a fuel cell stack assembly of the heater of FIGS. 1 and 3 taken through section line 6-6.
Figure 7:
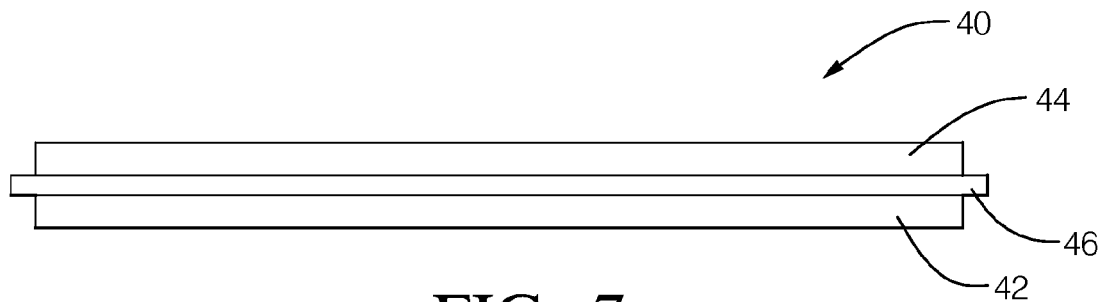
FIG. 7 is an elevation view of a fuel cell of the fuel cell stack assembly of FIG. 6.

With continued reference to all of the FIGS. but now with emphasis on FIGS. 6 and 7, fuel cell stack assemblies 20 may be, for example only, solid oxide fuel cells which generally include a fuel cell manifold 32, a plurality of fuel cell cassettes 34 (for clarity, only select fuel cell cassettes 34 have been labeled), and a fuel cell end cap 36. Fuel cell cassettes 34 are stacked together between fuel cell manifold 32 and fuel cell end cap 36 and are held therebetween in compression with tie rods 38. Each fuel cell stack assembly 20 may include, for example only, 20 to 50 fuel cell cassettes 34.

Each fuel cell cassette 34 includes a fuel cell 40 having an anode 42 and a cathode 44 separated by a ceramic electrolyte 46. Each fuel cell 40 converts chemical energy from a fuel supplied to anode 42 into heat and electricity through a chemical reaction with air supplied to cathode 44. Further features of fuel cell cassettes 34 and fuel cells 40 are disclosed in United States Patent Application Publication No. US 2012/0094201 to Haltiner, Jr. et al. which is incorporated herein by reference in its entirety.

Fuel cell manifold 32 receives fuel, e.g. a hydrogen rich reformate which may be supplied from a fuel reformer 48, through a fuel inlet 50 from one or both of first fuel supply conduit 22 and second fuel supply conduit 24 and distributes the fuel to each of the fuel cell cassettes 34. Fuel cell manifold 32 also receives an oxidizing agent, for example, air from an air supply 54, through an air inlet 52 from one or both of first air supply conduit 26 and second air supply conduit 28. Fuel cell manifold 32 also receives anode exhaust, i.e. spent fuel and excess fuel from fuel cells 40 which may comprise $H_2$, CO, $H_2O$, $CO_2$, and $N_2$, and discharges the anode exhaust from fuel cell manifold 32 through an anode exhaust outlet 56 which is in fluid communication with a respective combustor 30. Similarly, fuel cell manifold 32 also receives cathode exhaust, i.e. spent air and excess air from fuel cells 40 which may comprise $O_2$ (depleted compared to the air supplied through first air supply conduit 26 and second air supply conduit 28) and $N_2$, and discharges the cathode exhaust from fuel cell manifold 32 through a cathode exhaust outlet 58 which is in fluid communication with a respective combustor 30.

Figure 8:
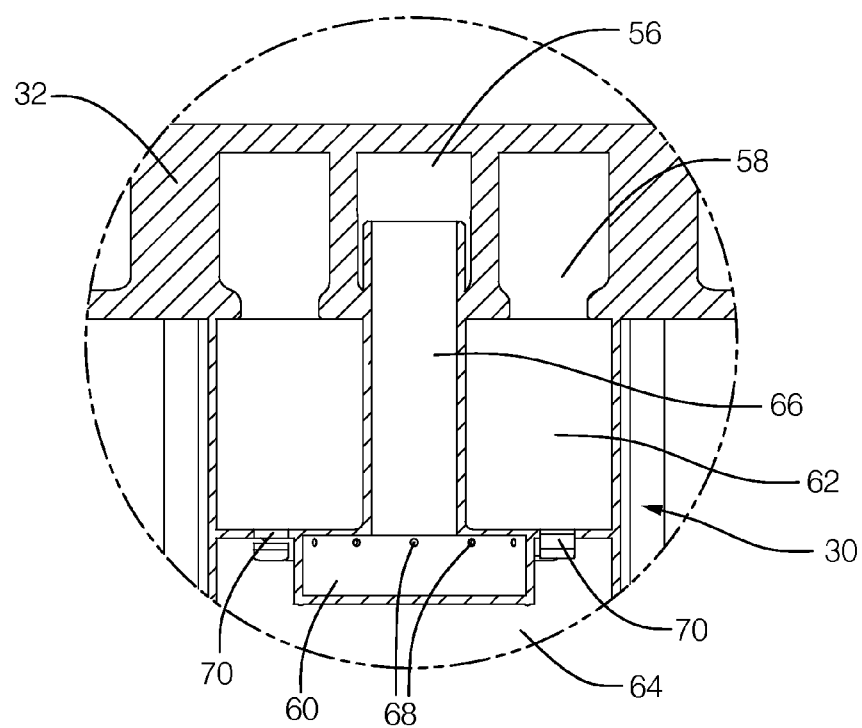
FIG. 8 is an enlargement of a portion of FIG. 7.
Figure 9:
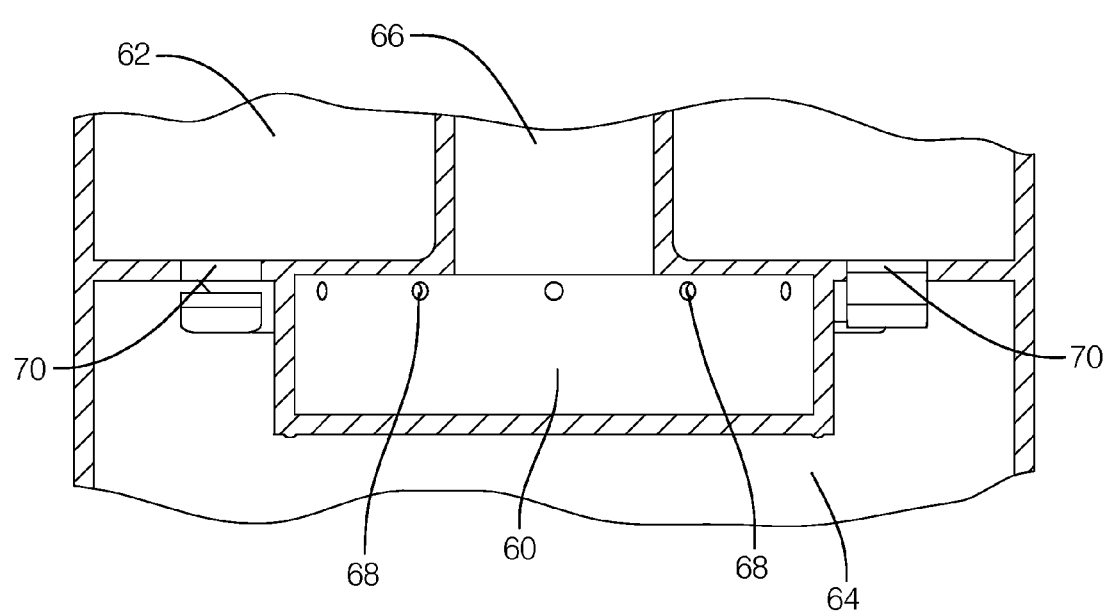
FIG. 9 is an enlargement of a portion of FIG. 8.
Figure 10:
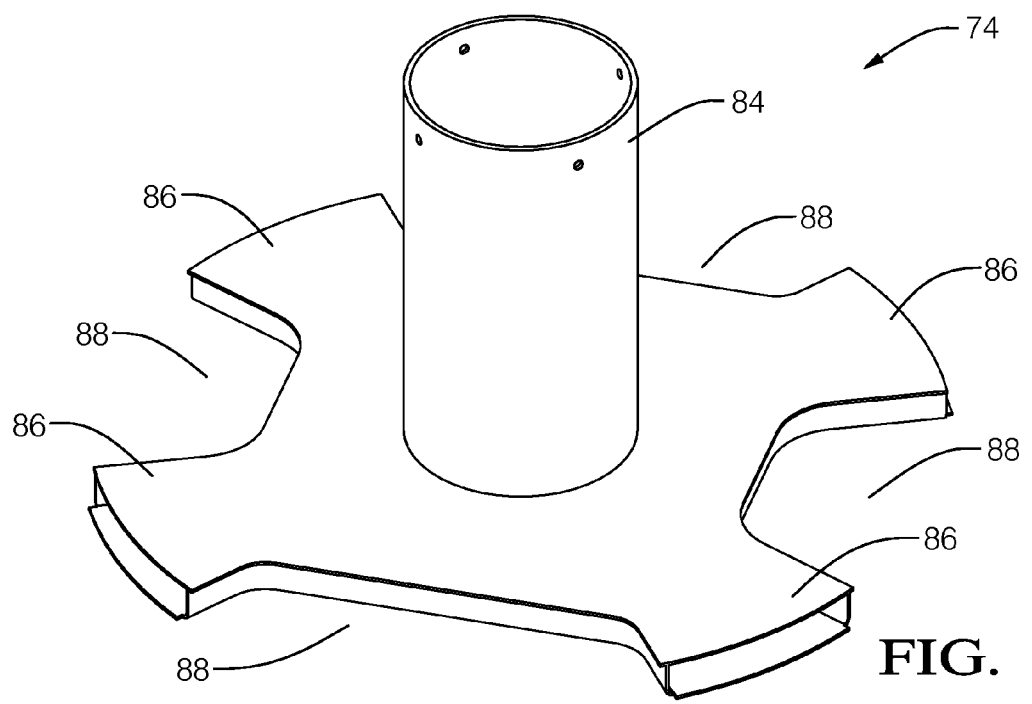
FIG. 10 is an isometric view of a flow director of a combustor of the heater of FIG. 1.
Figure 11:
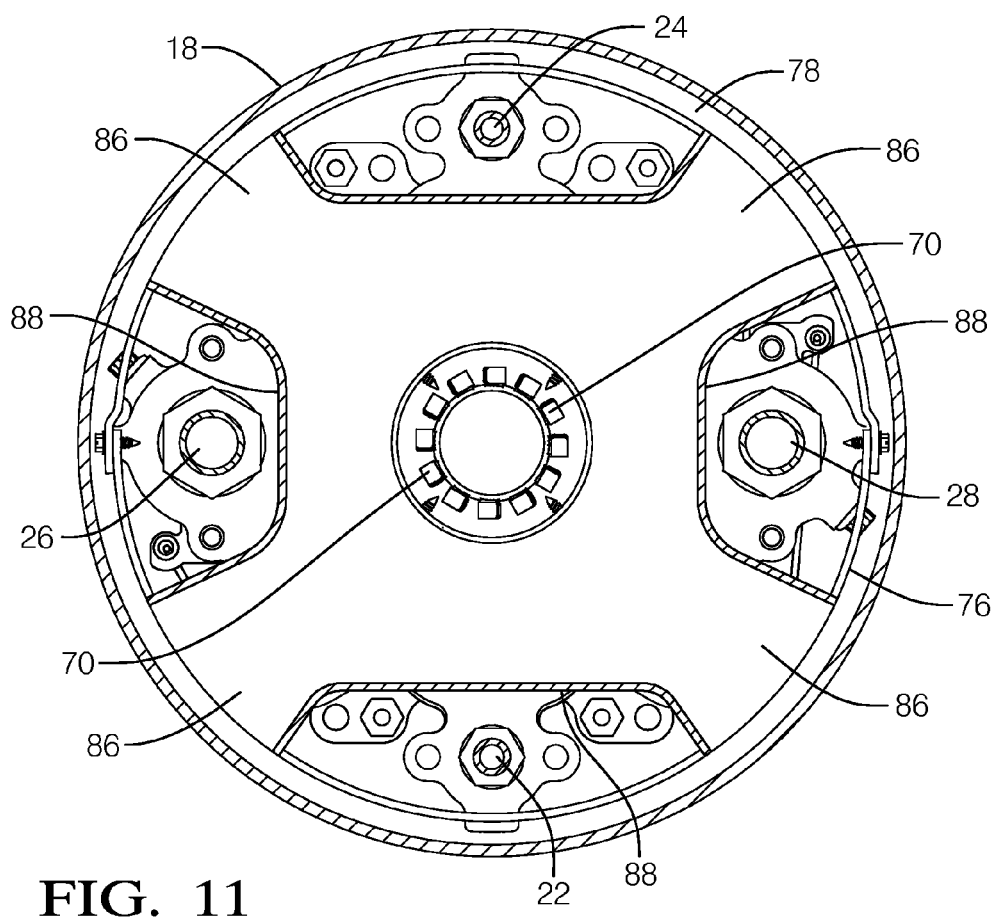
FIG. 11 is a radial cross-section view the heater of FIG. 1 taken through section line 11-11.
Figure 12:
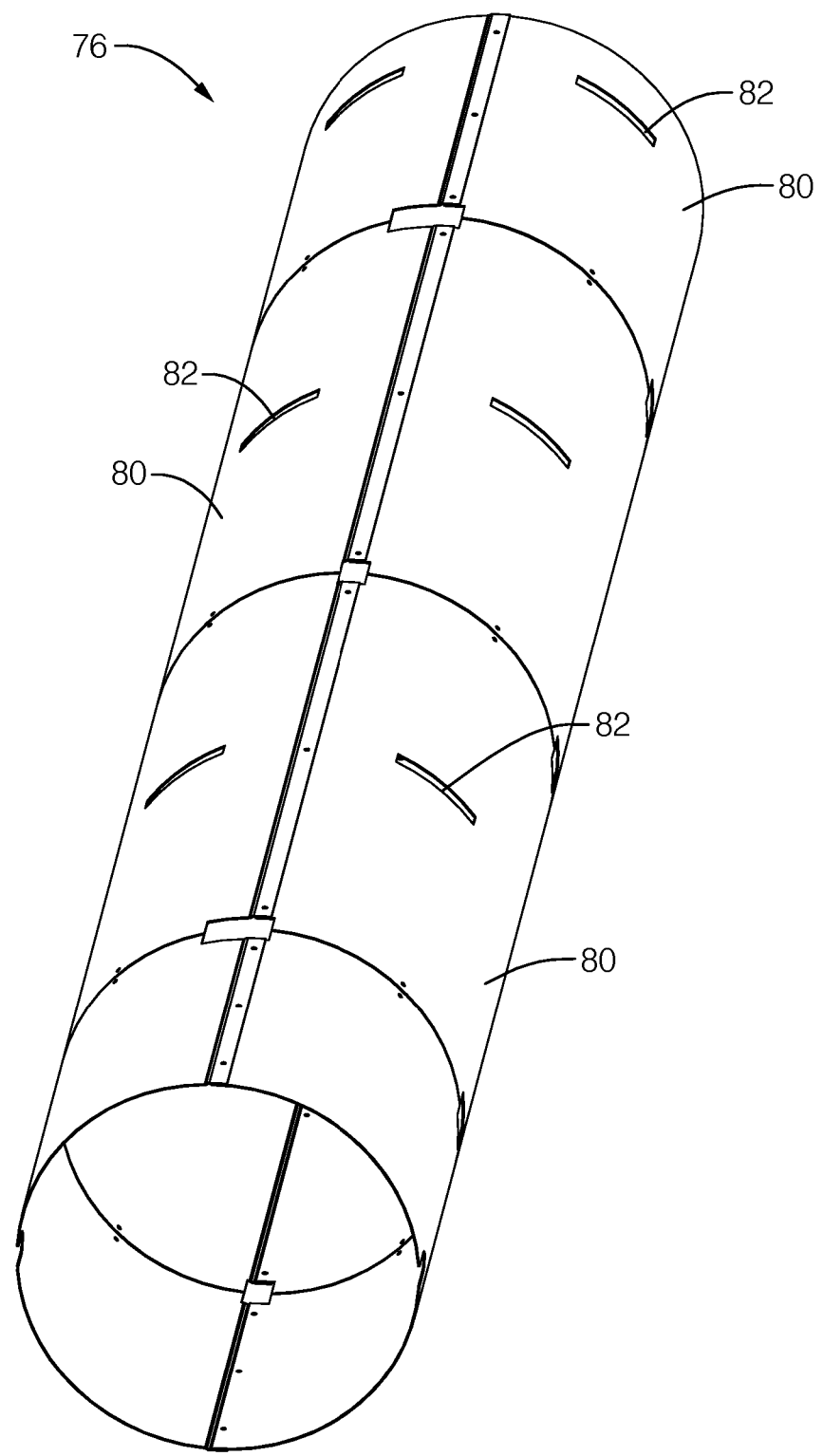
FIG. 12 is an isometric view of a baffle of the heater of FIG. 1.
Figure 13:
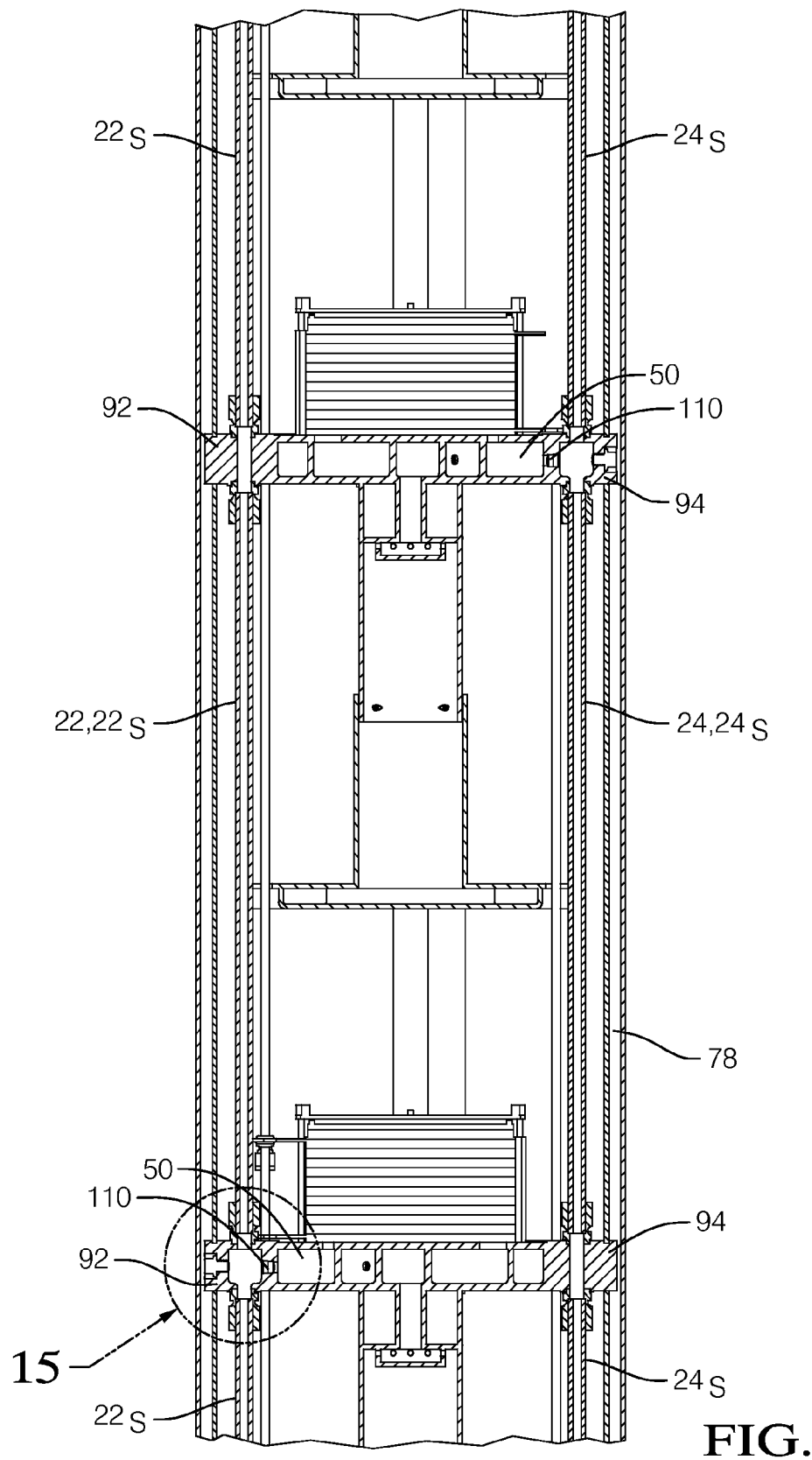
FIG. 13 is an enlargement of a portion of FIG. 4 showing adjacent fuel cell assemblies.
Figure 14:
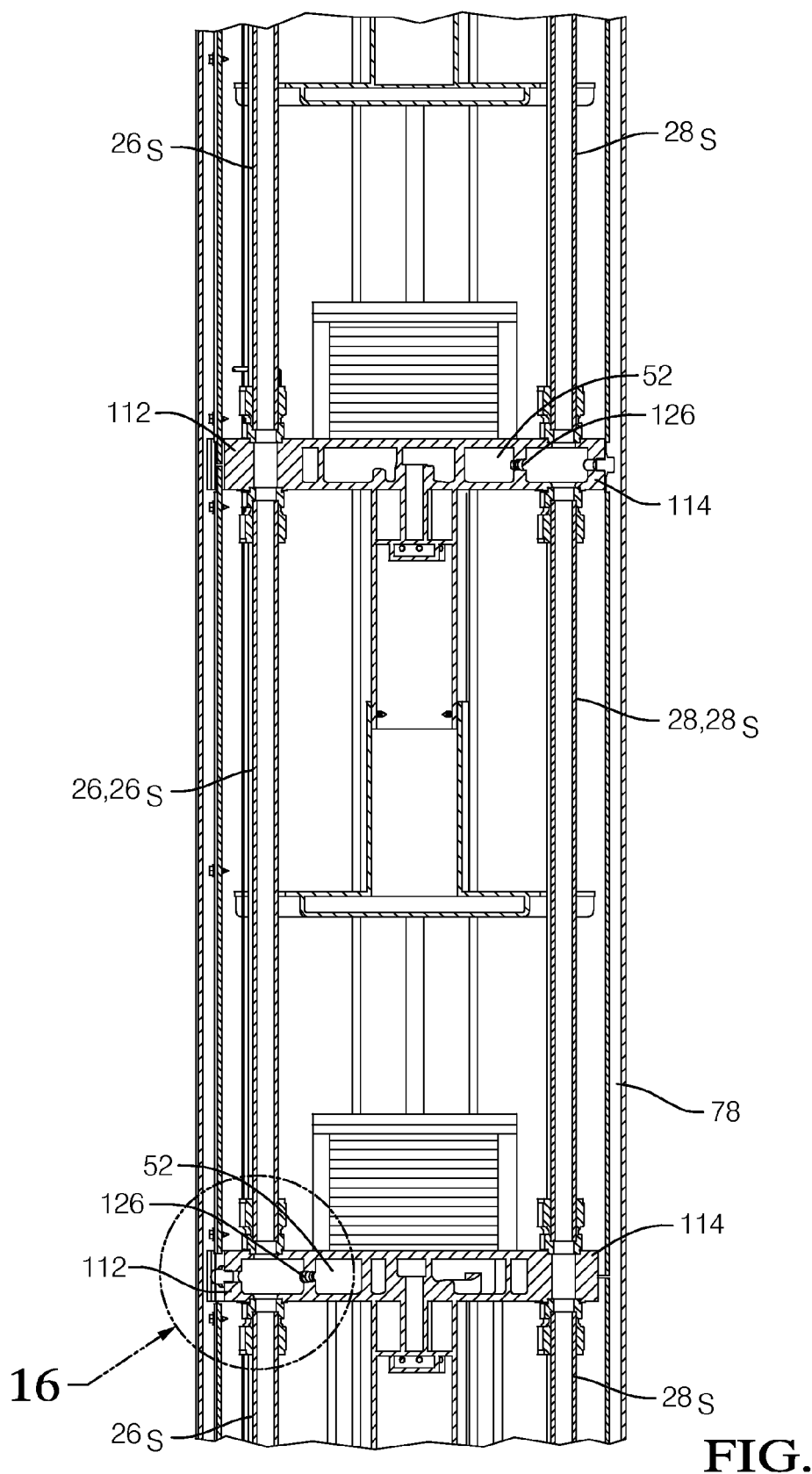
FIG. 14 is an enlargement of a portion of FIG. 5 showing adjacent fuel cell assemblies.

With continued reference to all of the FIGS. but now with emphasis on FIGS. 6, 8, and 9; combustor 30 may include an anode exhaust chamber 60 which receives anode exhaust from anode exhaust outlet 56 of fuel cell manifold 32, a cathode exhaust chamber 62 which receives cathode exhaust from cathode exhaust outlet 58 of fuel cell manifold 32, and a combustion chamber 64 which receives anode exhaust from anode exhaust chamber 60 and also receives cathode exhaust from cathode exhaust chamber 62. Anode exhaust chamber 60 may be substantially cylindrical and connected to anode exhaust outlet 56 through an anode exhaust passage 66 which is coaxial with anode exhaust chamber 60. Anode exhaust chamber 60 includes a plurality of anode exhaust mixing passages 68 which extend radially outward therefrom into combustion chamber 64. Cathode exhaust chamber 62 may be substantially annular in shape and radially surrounding anode exhaust passage 66 in a coaxial relationship. Cathode exhaust chamber 62 includes a plurality of cathode exhaust mixing passages 70 extending axially therefrom into combustion chamber 64. Cathode exhaust mixing passages 70 are located proximal to anode exhaust mixing passages 68 in order to allow anode exhaust gas exiting anode exhaust chamber 60 to impinge and mix with cathode exhaust exiting cathode exhaust chamber 62. Combustion of the mixture of anode exhaust and cathode exhaust may occur naturally due to the temperature within combustion chamber 64 being equal to or greater than the autoignition temperature of the mixture of anode exhaust and cathode exhaust due to the operation of fuel cell stack assemblies 20 or the operation of a plurality of electric resistive heating elements (not shown) that may be used to begin operation of fuel cell stack assemblies 20. In this way, anode exhaust is mixed with cathode exhaust within combustion chamber 64 and combusted therein to form a heated combustor exhaust comprising $CO_2$, $N_2$, $O_2$, and $H_2O$. Combustor 30 includes a combustor exhaust outlet 72 at the end of combustion chamber 64 for communicating the heated combustor exhaust from the combustor 30 to the interior volume of heater housing 18 thereby heating heater housing 18 and subsequently formation 16. Using combustor 30 to generate heat for heating formation 16 allows fuel cell stack assemblies 20 to be operated is such a way that promotes long service life of fuel cell stack assemblies 20 while allowing heaters 10 to generate the necessary heat for heating formation 16.

With continued reference to all of the FIGS. and now with emphasis on FIGS. 6, 10, 11, and 12; each combustor 30 may include a flow director 74 and heater 10 may include a baffle 76 positioned radially between fuel cell stack assemblies 20/combustors 30 and heater housing 18 in order increase the effectiveness of transferring heat from the heated combustor exhaust to heater housing 18 and subsequently to formation 16. Baffle 76 is substantially cylindrical and coaxial with heater housing 18, thereby defining a heat transfer channel 78, which may be substantially annular in shape, radially between heater housing 18 and baffle 76. As shown most clearly in FIG. 12, baffle 76 may be made of multiple baffle panels 80 (for clarity, only select baffle panels 80 have been labeled) in order to ease assembly of heater 10. Baffle panels 80 may be loosely joined together in order to prevent a pressure differential between heat transfer channel 78 and the volume that is radially inward of baffle 76. Baffle 76 includes a plurality of baffle apertures 82 (for clarity, only select baffle apertures 82 have been labeled) extending radially through baffle 76 to provide fluid communication from flow director 74 to heat transfer channel 78.

Flow director 74 includes a central portion 84 which is connected to combustor exhaust outlet 72 and receives the heated combustor exhaust therefrom. Flow director 74 also includes flow director outlets 86 which extend radially outward from central portion 84. Each flow director outlet 86 communicates with a respective baffle aperture 82 to communicate heated combustor exhaust to heat transfer channel 78. After being communicated to heat transfer channel 78, the heated combustor exhaust may pass upward through each heater 10 until reaching the top of bore hole 14. Each flow director outlet 86 defines a flow director cleft 88 with an adjacent flow director outlet 86. Flow director clefts 88 allow various elements, e.g. first fuel supply conduit 22, second fuel supply conduit 24, first air supply conduit 26, second air supply conduit 28, and electrical conductors, to extend axially uninterrupted through heater housing 18. Flow director 74 may be made of a material that has good oxidation resistance, for example, stainless steel or ceramic coated metal due to the high temperatures and corrosive conditions flow director 74 may experience in use. In addition to flow director 74 and baffle 76 providing the benefit of placing the heated combustor exhaust where heat can be most effectively be transferred to formation 16, flow director 74 and baffle 76 provide the benefit of segregating fuel cell stack assemblies 20 from the heated combustor exhaust because fuel cell stack assemblies 20 may be sensitive to the temperature of the heated combustor exhaust. In order to further thermally isolate fuel cell stack assemblies 20 from the heated combustor exhaust, baffle 76 may be made of a thermally insulative material or have a thermally isolative layer to inhibit transfer of thermal energy from heat transfer channel 78 to fuel cell stack assemblies 20.

With continued reference to all of the FIGS. but now with emphasis on FIGS. 4, 5, 13, 14, 15, and 16; in addition to first fuel supply conduit 22, second fuel supply conduit 24, first air supply conduit 26, and second air supply conduit 28 supplying fuel and air to fuel cell stack assemblies 20, first fuel supply conduit 22, second fuel supply conduit 24, first air supply conduit 26, and second air supply conduit 28 also provide structural support to fuel cell stack assemblies 20 within heater 10. The lower end of heater housing 18 includes a support plate 90 therein. Support plate 90 is of sufficient strength and securely fastened to heater housing 18 in order support the weight of fuel cell stack assemblies 20, combustors 30 first fuel supply conduit 22, second fuel supply conduit 24, first air supply conduit 26, second air supply conduit 28 and baffle 76 that are located within heater 10. Support plate 90 is arranged to allow the heated combustor exhaust from lower heaters 10 to rise through each heater housing 18, much like a chimney, ultimately allowing the heated combustor exhaust to pass to the surface of formation 16.

First fuel supply conduit 22 and second fuel supply conduits 24 are comprised of first fuel supply conduit sections $22_S$ and second fuel supply conduit sections $24_S$ respectively which are positioned between support plate 90 and the lowermost fuel cell stack assembly 20 within heater 10, between adjacent fuel cell stack assemblies 20 within a heater 10, and between the uppermost fuel cell stack assembly 20 within a heater 10 and support plate 90 of the next adjacent heater 10. Similarly, first air supply conduit 26 and second air supply conduits 28 are comprised of first air supply conduit sections $26_S$ and second air supply conduit sections $28_S$ respectively which are positioned between support plate 90 and the lowermost fuel cell stack assembly 20 within heater 10, between adjacent fuel cell stack assemblies 20 within a heater 10, and between the uppermost fuel cell stack assembly 20 within a heater 10 and support plate 90 of the next adjacent heater 10.

Each fuel cell manifold 32 includes a first fuel supply boss 92 and a second fuel supply boss 94. First fuel supply boss 92 and second fuel supply boss 94 extend radially outward from fuel cell manifold 32 and include an upper fuel supply recesses 100 and a lower fuel supply recess 102 which extend axially thereinto from opposite sides for receiving an end of one first fuel supply conduit section $22_S$ or one second fuel supply conduit section $24_S$ in a sealing manner. Upper fuel supply recess 100 and lower fuel supply recess 102 of each first fuel supply boss 92 and second fuel supply boss 94 are fluidly connected by a fuel supply through passage 104 which extends axially between upper fuel supply recess 100 and lower fuel supply recess 102. An upper fuel supply shoulder 106 is defined at the bottom of upper fuel supply recess 100 while a lower fuel supply shoulder 108 is defined at the bottom of upper fuel supply recess 100. In this way, first fuel supply conduit sections $22_S$ form a support column with first fuel supply bosses 92, thereby supporting fuel cell stack assemblies 20 and combustors 30 on support plate 90 within heater housing 18. Similarly, second fuel supply conduit sections $24_S$, form a support column with second fuel supply bosses 94, thereby supporting fuel cell stack assemblies 20 and combustors 30 on support plate 90 within heater housing 18. First fuel supply conduit sections $22_S$ and second fuel supply conduit sections $24_S$ may be made of a material that is substantially strong to accommodate the weight of fuel cell stack assemblies 20 and combustors 30 within heater 10. The material of first fuel supply conduit sections $22_S$ and second fuel supply conduit sections $24_S$ may also have properties to withstand the elevated temperatures within heater housing 18 as a result of the operation of fuel cell stack assemblies 20 and combustors 30. For example only, first fuel supply conduit sections $22_S$ and second fuel supply conduit sections $24_S$ may be made of a 300 series stainless steel with a wall thickness of 1/16 of an inch.

Fuel passing through first fuel supply conduit 22 and second fuel supply conduit 24 may be communicated to fuel inlet 50 of fuel cell manifold 32 via a fuel flow connection passage 110 extending between fuel supply pass through passage 104 and fuel inlet 50. As shown, in FIG. 13, each fuel cell manifold 32 may include only one fuel flow connecting passage 110 which connects pass through passage 104 of either first fuel supply boss 92 or second fuel supply boss 94 to fuel inlet 50. Also as shown, fuel cell manifolds 32 of adjacent fuel cell stack assemblies 20 may include fuel flow connecting passage 110 in opposite first and second fuel supply bosses 92, 94 such that every other fuel cell manifold 32 receives fuel from first fuel supply conduit 22 while the remaining fuel cell manifolds 32 receive fuel from second fuel supply conduit 24. However; it should be understood that, alternatively, both first fuel supply boss 92 and second fuel supply boss 94 of some or all of fuel cell manifolds 32 may include fuel flow connection passage 110 in order to supply fuel to fuel inlet 50 from both first fuel supply conduit 22 and second fuel supply conduit 24.

Each fuel cell manifold 32 includes a first air supply boss 112 and a second air supply boss 114. First air supply boss 112 and second air supply boss 114 extend radially outward from fuel cell manifold 32 and include an upper air supply recesses 116 and a lower air supply recess 118 which extend axially thereinto from opposite sides for receiving an end of one first air supply conduit section $26_S$, or one second air supply conduit section $28_S$ in a sealing manner. Upper air supply recess 116 and lower air supply recess 118 of each first air supply boss 112 and second air supply boss 114 are fluidly connected by an air supply through passage 120 which extends axially between upper air supply recess 116 and lower air supply recess 118. An upper air supply shoulder 122 is defined at the bottom of upper air supply recess 116 while a lower fuel supply shoulder 124 is defined at the bottom of lower air supply recess 118. In this way, first air supply conduit sections $26_S$ form a support column with first air supply bosses 112, thereby supporting fuel cell stack assemblies 20 and combustors 30 on support plate 90 within heater housing 18. Similarly, second air supply conduit sections $28_S$, form a support column with second air supply bosses 114, thereby supporting fuel cell stack assemblies 20 and combustors 30 on support plate 90 within heater housing 18. First air supply conduit sections $26_S$ and second air supply conduit sections $28_S$ may be made of a material that is substantially strong to accommodate the weight of fuel cell stack assemblies 20 and combustors 30 within heater 10. The material of first air supply conduit sections $26_S$ and second air supply conduit sections $28_S$ may also have properties to withstand the elevated temperatures within heater housing 18 as a result of the operation of fuel cell stack assemblies 20 and combustors 30. For example only, first air supply conduit sections $26_S$ and second air supply conduit sections $28_S$ may be made of a 300 series stainless steel with a wall thickness of 1/16 of an inch.

Supporting fuel cell stack assemblies 20 and combustors 30 from the bottom of heater housing 18 on support plate 90 results in the weight being supported by first air supply conduit sections $26_S$, second air supply conduit sections $28_S$, first air supply conduit sections $26_S$, and second air supply conduit sections $28_S$ in compression which maximizes the strength of first air supply conduit sections $26_S$, second air supply conduit sections $28_S$, first air supply conduit sections $26_S$, and second air supply conduit sections $28_S$ and requires minimal strength of connection fasteners which join first air supply conduit sections $26_S$, second air supply conduit sections $28_S$, first air supply conduit sections $26_S$, and second air supply conduit sections $28_S$. This also tends to promote sealing first air supply conduit sections $26_S$, second air supply conduit sections $28_S$, first air supply conduit sections $26_S$, and second air supply conduit sections $28_S$ with fuel cell manifolds 32. Combining the structural support of fuel cell stack assemblies 20 and combustors 30 by supply conduit sections $26_S$, second air supply conduit sections $28_S$, first air supply conduit sections $26_S$, and second air supply conduit sections $28_S$ provides the further advantage of avoiding additional structural components. Furthermore, supply conduit sections $26_S$, second air supply conduit sections $28_S$, first air supply conduit sections $26_S$, and second air supply conduit sections $28_S$ of a given heater $10_x$ are independent of all other heaters 10 in the sense that they only need to support fuel cell stack assemblies 20 and combustors 30 of heater $10_x$, thereby relying on heater housings 18 of heaters 10 as the principal support for heaters 10.

Fuel passing through first air supply conduit 26 and second air supply conduit 28 may be communicated to air inlet 52 of fuel cell manifold 32 via an air flow connection passage 126 extending between air supply pass through passage 120 and air inlet 52. As shown, in FIG. 14, each fuel cell manifold 32 may include only one air flow connecting passage 126 which connects air supply through passage 120 of either first air supply boss 112 or second air supply boss 114 to air inlet 52. Also as shown, fuel cell manifolds 32 of adjacent fuel cell stack assemblies 20 may include air flow connection passage 126 in opposite first and second air supply bosses 112, 114 such that every other fuel cell manifold 32 receives air from first air supply conduit 26 while the remaining fuel cell manifolds 32 receive air from second air supply conduit 28. However; it should be understood that, alternatively, both first air supply boss 112 and second air supply boss 114 of some or all of fuel cell manifolds 32 may include air flow connection passage 126 in order to supply air to air inlet 52 from both first air supply conduit 26 and second air supply conduit 28.

When heaters $10_1, 10_2, \ldots 10_{n-1}, 10_n$ are connected together in sufficient number and over a sufficient distance, the pressure of fuel at fuel cell stack assemblies 20 may vary along the length of heaters $10_1, 10_2, \ldots 10_{n-1}, 10_n$. This variation in the pressure of fuel may lead to varying fuel flow to fuel cell stack assemblies 20 that may not be compatible with desired operation of each fuel cell stack assembly 20. In order to obtain a sufficiently uniform flow of fuel to each fuel cell stack assembly 20, fuel flow connection passages 110 may include a sonic fuel orifice 128 therein. Sonic fuel orifice 128 is sized to create a pressure differential between the fuel pressure within fuel supply through passage 104 and the fuel pressure within fuel inlet 50 such that the ratio of the fuel pressure within fuel supply through passage 104 to the fuel pressure within fuel inlet 50 is at least 1.85:1 which is known as the critical pressure ratio. When the critical pressure ratio is achieved at each sonic fuel orifice 128, the velocity of fuel through each sonic fuel orifice 128 will be the same and will be held constant as long as the ratio of the fuel pressure within fuel supply through passage 104 to the fuel pressure within fuel inlet 50 is at least 1.85:1. Since the velocity of fuel through each sonic fuel orifice 128 is equal, the flow of fuel to each fuel cell stack assembly 20 will be sufficiently the same for desired operation of each fuel cell stack assembly 20. The density of the fuel may vary along the length of heaters $10_1$, $10_2, \ldots 10_{n-1}, 10_n$ due to pressure variation within first fuel supply conduit 22 and second fuel supply conduit 24, thereby varying the mass flow of fuel to each fuel cell stack assembly 20; however, the variation in pressure within first fuel supply conduit 22 and second fuel supply conduit 24 is not sufficient to vary the mass flow of fuel to each fuel cell stack assembly 20 to an extent that would not be compatible with desired operation of each fuel cell stack assembly 20.

Since sonic fuel orifices 128 substantially fix the flow of fuel to fuel cell stack assemblies 20, the electricity and/or thermal output of fuel cell stack assemblies 20 may not be able to be substantially varied by varying the flow of fuel to fuel cell stack assemblies 20. In order to vary the electricity and/or thermal output of fuel cell stack assemblies 20, the composition of the fuel may be varied in order to achieve the desired electricity and/or thermal output of fuel cell stack assemblies 20. As described previously, fuel is supplied to fuel cell stack assemblies 20 by fuel reformer 48. Fuel reformer 48 may reform a hydrocarbon fuel, for example $CH_4$, from a hydrocarbon fuel source 130 to produce a blend of $H_2$, $CO$, $H_2O$, $CO_2$, $N_2$, $CH_4$. The portion of the blend which is used by fuel cell stack assemblies 20 to generate electricity and heat is $H_2$, $CO$, and $CH_4$ which may be from about 10% to about 90% of the blend. Fuel reformer 48 may be operated to yield a concentration of $H_2$, $CO$, and $CH4$ that will result in the desired electricity and/or thermal output of fuel cell stack assemblies 20. Furthermore, a dilutant such as excess $H_2O$ or $N_2$ may be added downstream of fuel reformer 48 from a dilutant source 131 to further dilute the fuel. In this way, the fuel composition supplied to fuel cell stack assemblies 20 may be varied to achieve a desired electricity and/or thermal output of fuel cell stack assemblies 20.

Similarly, when heaters $10_1, 10_2, \ldots 10_{n-1}, 10_n$ are connected together in sufficient number and over a sufficient distance, the pressure of air at fuel cell stack assemblies 20 may vary along the length of heaters $10_1, 10_2, \ldots 10_{n-1}, 10_n$. This variation in the pressure of air may lead to varying air flow to fuel cell stack assemblies 20 that may not be compatible with desired operation of each fuel cell stack assembly 20. In order to obtain a sufficiently uniform flow of air to each fuel cell stack assembly 20, air flow connection passages 126 may include a sonic air orifice 132 therein. Sonic air orifice 132 is sized to create a pressure differential between the air pressure within air supply through passage 120 and the air pressure within air inlet 52 such that the ratio of the air pressure within air supply through passage 120 to the air pressure within air inlet 52 is at least 1.85:1 which is known as the critical pressure ratio. When the critical pressure ratio is achieved at each sonic air orifice 132, the velocity of air through each sonic air orifice 132 will be the same and will be held constant as long as the ratio of the air pressure within air supply through passage 120 to the air pressure within air inlet 52 is at least 1.85:1. Since the velocity of air through each sonic air orifice 132 is equal, the flow of air to each fuel cell stack assembly 20 will be sufficiently the same for desired operation of each fuel cell stack assembly 20. The density of the air may vary along the length of heaters $10_1, 10_2, \ldots 10_{n-1}, 10_n$ due to pressure variation within first air supply conduit 26 and second air supply conduit 28, thereby varying the mass flow of air to each fuel cell stack assembly 20; however, the variation in pressure within first air supply conduit 26 and second air supply conduit 28 is not sufficient to vary the mass flow of air to each fuel cell stack assembly 20 to an extent that would not be compatible with desired operation of each fuel cell stack assembly 20.

Since sonic air orifices 132 substantially fix the flow of fuel to fuel cell stack assemblies 20, the electricity and/or thermal output of fuel cell stack assemblies 20 may not be able to be substantially varied by varying the flow of fuel to fuel cell stack assemblies 20. There are multiple strategies that may be utilized for supplying a sufficient amount of air in order to vary the electricity and/or thermal output of fuel cell stack assemblies 20. In a first strategy, sonic air orifices 132 may be sized to supply a sufficient amount of air needed to operate fuel cell stack assemblies 20 at maximum output. In this strategy, excess air will be supplied to fuel cell stack assemblies 20 when fuel cell stack assemblies 20 are operated below maximum output. The excess air supplied to fuel cell stack assemblies 20 will simply be passed to combustors 30 where it will be used to produce the heated combustor exhaust as described previously.

In a second strategy, sonic air orifices 132 may be sized to supply a sufficient amount of air needed to operate fuel cell stack assemblies 20 at medium output. When fuel cell stack assemblies 20 are desired to operate above medium output, additional hydrocarbon fuel, for example $CH_4$, may be supplied to first fuel supply conduit 22 and second fuel supply conduit 24 downstream of fuel reformer 48. The additional $CH_4$ that is added downstream of fuel reformer 48 may be supplied by hydrocarbon fuel source 130 or from another source. The un-reformed $CH_4$ will be supplied to fuel cell stack assemblies 20 where the $CH_4$ will be reformed within fuel cell stack assemblies 20 through an endothermic reaction which absorbs additional heat that would otherwise require additional air. In this way, fuel cell stack assemblies 20 may be operated at maximum output while requiring lesser amounts of air.

Figure 15:
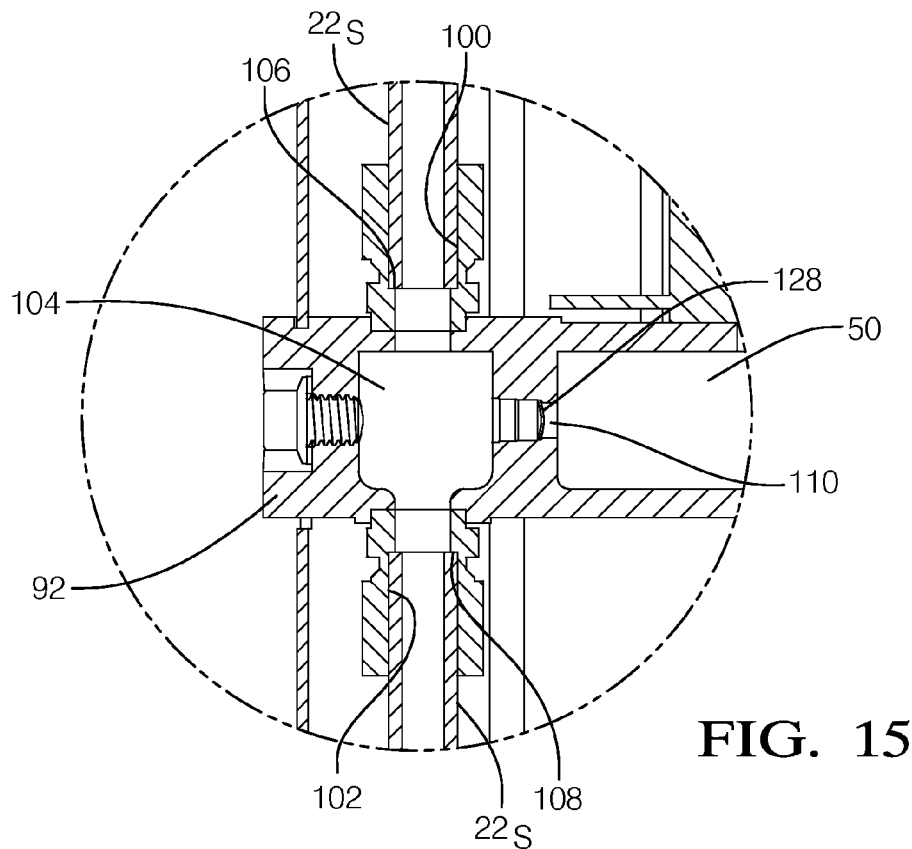
FIG. 15 is an enlargement of a portion of FIG. 13.
Figure 16:
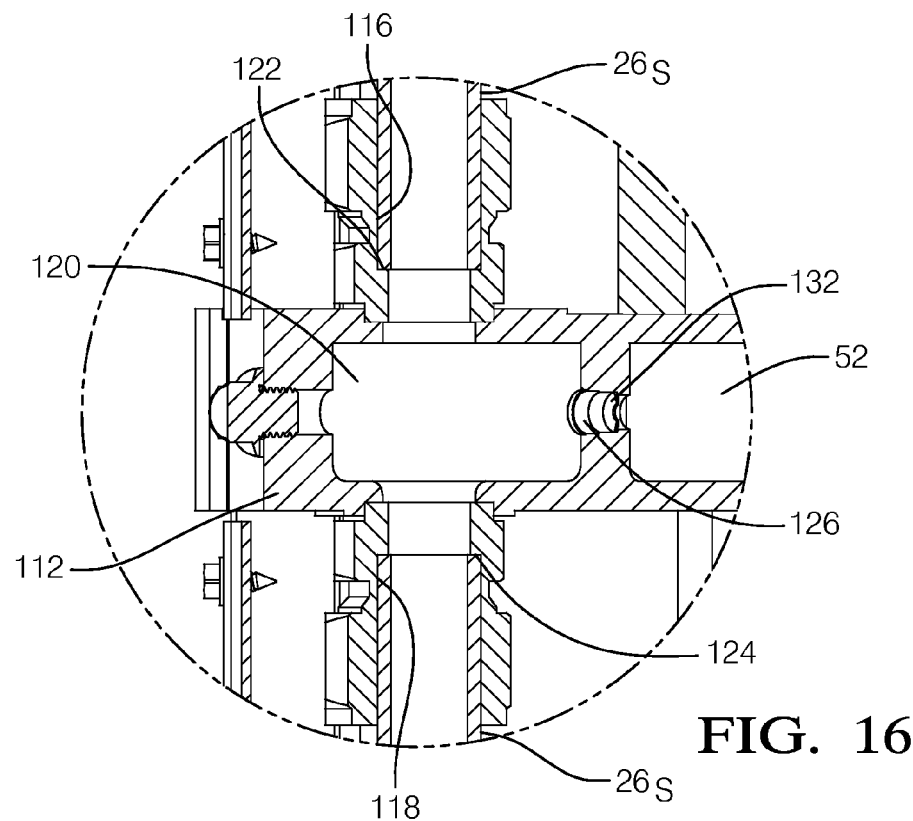
FIG. 16 is an enlargement of a portion of FIG. 14.
Figure 17:
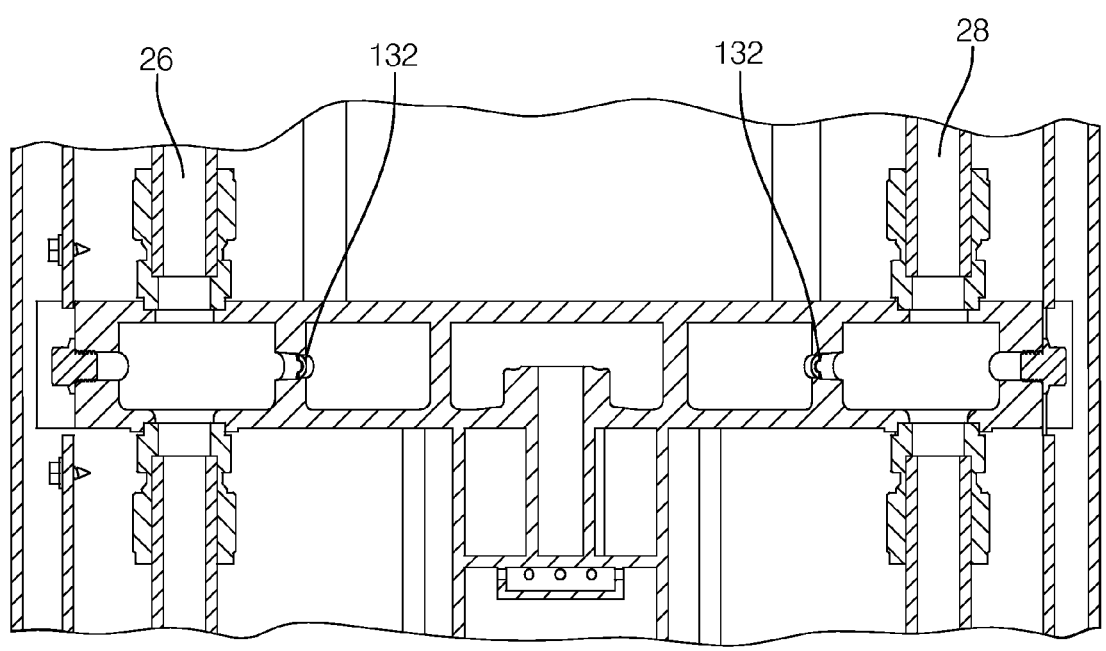
FIG. 17 is an alternative arrangement of FIG. 14.

In a third strategy, each fuel cell stack assembly 20 may be in fluid communication with both first air supply conduit 26 and second air supply conduit 28 as shown in FIG. 15. However, sonic air orifice 132 which receives air from first air supply conduit 26 may be sized to supply a sufficient amount of air needed to operate fuel cell stack assemblies 20 at a low output level while sonic air orifice 132 which receives air from second air supply conduit 28 may be sized to supply a sufficient amount of air needed to operate fuel cell stack assemblies 20 at a medium output level. When fuel cell stack assemblies 20 are desired to be operated at the low output level, air may supplied to fuel cell stack assemblies 20 only through first air supply conduit 26. When fuel cell stack assemblies 20 are desired to be operated at the medium output, air may be supplied to fuel cell stack assemblies 20 only through second air supply conduit 28. When fuel cell stack assemblies 20 are desired to be operated above the medium output, for example, the maximum output, air may be supplied to fuel cell stack assemblies 20 through both first air supply conduit 26 and second air supply conduit 28. In this way, variable amounts of air can be supplied to fuel cell stack assemblies 20, thereby increasing efficiency by supplying less air at lower output levels of fuel cell stack assemblies 20.

In use, heaters $10_1, 10_2, \ldots 10_{n-1}, 10_n$ are operated by supplying fuel and air to fuel cell stack assemblies 20 which are located within heater housing 18. Fuel cell stack assemblies 20 carry out a chemical reaction between the fuel and air, causing fuel cell stack assemblies 20 to be elevated in temperature, for example, about 600° C. to about 900° C. The anode exhaust and cathode exhaust of fuel cell stack assemblies 20 is mixed and combusted within respective combustors 30 to produce a heated combustor exhaust which is discharged within heater housing 18. Consequently, fuel cell stack assemblies 20 together with the heated combustor exhaust elevate the temperature of heater housing 18 with subsequently elevates the temperature of formation 16.

While this invention has been described in terms of preferred embodiments thereof, it is not intended to be so limited, but rather only to the extent set forth in the claims that follow.

We claim:

1. A heater comprising:
a heater housing extending along a heater axis and having a first end and a second end;
a support plate secured to said second end of said heater housing;
a fuel cell stack assembly disposed within said heater housing and having a plurality of fuel cells which convert chemical energy from a fuel into heat and electricity through a chemical reaction with an oxidizing agent, said fuel cell stack assembly having a fuel cell manifold for 1) receiving said fuel and distributing said fuel to said plurality of fuel cells and 2) receiving said oxidizing agent and distributing said oxidizing agent to said plurality of fuel cells;
a fuel supply conduit in fluid communication with said fuel cell manifold for communicating said fuel to said fuel cell manifold for distribution to said plurality of fuel cells; and
an oxidizing agent supply conduit in fluid communication with said fuel cell manifold for communicating said oxidizing agent to said fuel cell manifold for distribution to said plurality of fuel cells;
wherein said fuel cell stack assembly is supported on said support plate by one of said fuel supply conduit and said oxidizing agent supply conduit, which thereby provides a support column for said fuel cell stack assembly;
wherein said fuel cell manifold comprises:
a fuel supply boss extending radially outward from said fuel cell manifold for receiving said fuel supply conduit, said fuel supply boss including an upper fuel supply recess extending axially into said fuel supply boss and a lower fuel supply recess extending axially into said fuel supply boss such that said upper fuel supply recess and said lower fuel supply recess extend into said fuel supply boss from opposite sides of said fuel supply boss; and
an oxidizing agent supply boss extending radially outward from said fuel cell manifold for receiving said oxidizing agent supply conduit.

2. A heater as in claim 1 wherein:
said fuel supply conduit comprises a plurality of fuel supply conduit segments;
said upper fuel supply recess receives one of said plurality of fuel supply conduit segments therein; and
said lower fuel supply recess receives another one of said plurality of fuel supply conduit segments therein.

3. A heater as in claim 2 wherein said fuel supply boss includes a fuel supply through passage providing fluid communication between said one of said plurality of fuel supply conduit segments and said another one of said plurality of fuel supply conduit segments.

4. A heater as in claim 1 wherein said oxidizing agent supply boss includes an upper oxidizing agent supply recess extending axially into said oxidizing agent supply boss and a lower oxidizing agent supply recess extending axially into said oxidizing agent supply boss such that said upper oxidizing agent supply recess and said lower oxidizing agent supply recess extend into said oxidizing agent supply boss from opposite sides of said oxidizing agent supply boss.

5. A heater as in claim 4 wherein:
said oxidizing agent supply conduit comprises a plurality of oxidizing agent supply conduit segments;
said upper oxidizing agent supply recess receives one of said plurality of oxidizing agent supply conduit segments therein; and
said lower oxidizing agent supply recess receives another one of said plurality of oxidizing agent supply conduit segments therein.

6. A heater as in claim 5 wherein said oxidizing agent supply boss includes an oxidizing agent supply through passage providing fluid communication between said one of said plurality of oxidizing agent supply conduit segments and said another one of said plurality of oxidizing agent supply conduit segments.

7. A heater comprising:
a heater housing extending along a heater axis and having a first end and a second end;
a support plate secured to said second end of said heater housing;
a fuel cell stack assembly disposed within said heater housing and having a plurality of fuel cells which convert chemical energy from a fuel into heat and electricity through a chemical reaction with an oxidizing agent, said fuel cell stack assembly having a fuel cell manifold for 1) receiving said fuel and distributing said fuel to said plurality of fuel cells and 2) receiving said oxidizing agent and distributing said oxidizing agent to said plurality of fuel cells;
a fuel supply conduit in fluid communication with said fuel cell manifold for communicating said fuel to said fuel cell manifold for distribution to said plurality of fuel cells; and
an oxidizing agent supply conduit in fluid communication with said fuel cell manifold for communicating said oxidizing agent to said fuel cell manifold for distribution to said plurality of fuel cells;
wherein said fuel cell stack assembly is supported on said support plate by one of said fuel supply conduit and said oxidizing agent supply conduit, which thereby provides a support column for said fuel cell stack assembly;
wherein said fuel cell stack assembly is one of a plurality of fuel cell stack assemblies disposed within said heater housing such that each one of said plurality of fuel cell stack assemblies is positioned axially with respect to every other of said plurality of fuel cell stack assemblies;
wherein each of said plurality of fuel cell stack assemblies is supported on said support plate by one of said fuel supply conduit and said oxidizing agent supply conduit, which thereby provides a support column for each one of said plurality of fuel cell stack assemblies;
wherein said fuel supply conduit is a first fuel supply conduit and said heater comprises a second fuel supply conduit such that said first fuel supply conduit supplies said fuel to at least one of said plurality of fuel cell stack assemblies and said second fuel supply conduit supplies said fuel to at least another one of said plurality of fuel cell stack assemblies;
wherein said oxidizing agent supply conduit is a first oxidizing agent supply conduit and said heater comprises a second oxidizing agent supply conduit such that said first oxidizing agent supply conduit supplies said oxidizing agent to at least one of said plurality of fuel cell stack assemblies and said second oxidizing agent supply conduit supplies said oxidizing agent to at least another one of said plurality of fuel cell stack assemblies;

wherein each of said plurality of fuel cell stack assemblies is supported on said support plate by said first fuel supply conduit, said second fuel supply conduit, said first oxidizing agent supply conduit, and said second oxidizing agent supply conduit; and wherein said fuel cell manifold of each of said plurality of fuel cell stack assemblies comprise:

a first fuel supply boss extending radially outward from said fuel cell manifold for receiving said first fuel supply conduit;

a second fuel supply boss extending radially outward from said fuel cell manifold for receiving said second fuel supply conduit;

a first oxidizing agent supply boss extending radially outward from said fuel cell manifold for receiving said first oxidizing agent supply conduit; and a second oxidizing agent supply boss extending radially outward from said fuel cell manifold for receiving said second oxidizing agent supply conduit;

wherein said first fuel supply boss and said second fuel supply boss each include an upper fuel supply recess extending axially thereinto and a lower fuel supply recess extending axially thereinto such that said upper fuel supply recess and said lower fuel supply recess of said first fuel supply boss extend into said first fuel supply boss from opposite sides thereof and such that said upper fuel supply recess and said lower fuel supply recess of said second fuel supply boss extend into said second fuel supply boss from opposite sides thereof.

8. A heater as in claim 7 wherein:

said first fuel supply conduit comprises a plurality of first fuel supply conduit segments;

said second fuel supply conduit comprises a plurality of second fuel supply conduit segments;

said upper fuel supply recess of said first fuel supply boss receives one of said plurality of first fuel supply conduit segments therein;

said lower fuel supply recess of said first fuel supply boss receives another one of said plurality of first fuel supply conduit segments therein;

said upper fuel supply recess of said second fuel supply boss receives one of said plurality of second fuel supply conduit segments therein; and said lower fuel supply recess of said second fuel supply boss receives another one of said plurality of second fuel supply conduit segments therein.

9. A heater as in claim 8 wherein each of said first fuel supply boss and said second fuel supply boss includes a fuel supply through passage such that said fuel supply through passage of said first fuel supply boss provides fluid communication between said one of said plurality of first fuel supply conduit segments and said another one of said plurality of first fuel supply conduit segments and such that said fuel supply through passage of said second fuel supply boss provides fluid communication between said one of said plurality of second fuel supply conduit segments and said another one of said plurality of second fuel supply conduit segments.

10. A heater comprising:

a heater housing extending along a heater axis and having a first end and a second end;

a support plate secured to said second end of said heater housing;

a fuel cell stack assembly disposed within said heater housing and having a plurality of fuel cells which convert chemical energy from a fuel into heat and electricity through a chemical reaction with an oxidizing agent, said fuel cell stack assembly having a fuel cell manifold for 1) receiving said fuel and distributing said fuel to said plurality of fuel cells and 2) receiving said oxidizing agent and distributing said oxidizing agent to said plurality of fuel cells;

a fuel supply conduit in fluid communication with said fuel cell manifold for communicating said fuel to said fuel cell manifold for distribution to said plurality of fuel cells; and an oxidizing agent supply conduit in fluid communication with said fuel cell manifold for communicating said oxidizing agent to said fuel cell manifold for distribution to said plurality of fuel cells;

wherein said fuel cell stack assembly is supported on said support plate by one of said fuel supply conduit and said oxidizing agent supply conduit, which thereby provides a support column for said fuel cell stack assembly;

wherein said fuel cell stack assembly is one of a plurality of fuel cell stack assemblies disposed within said heater housing such that each one of said plurality of fuel cell stack assemblies is positioned axially with respect to every other of said plurality of fuel cell stack assemblies;

wherein each of said plurality of fuel cell stack assemblies is supported on said support plate by one of said fuel supply conduit and said oxidizing agent supply conduit, which thereby provides a support column for each one of said plurality of fuel cell stack assemblies;

wherein said fuel supply conduit is a first fuel supply conduit and said heater comprises a second fuel supply conduit such that said first fuel supply conduit supplies said fuel to at least one of said plurality of fuel cell stack assemblies and said second fuel supply conduit supplies said fuel to at least another one of said plurality of fuel cell stack assemblies;

wherein said oxidizing agent supply conduit is a first oxidizing agent supply conduit and said heater comprises a second oxidizing agent supply conduit such that said first oxidizing agent supply conduit supplies said oxidizing agent to at least one of said plurality of fuel cell stack assemblies and said second oxidizing agent supply conduit supplies said oxidizing agent to at least another one of said plurality of fuel cell stack assemblies; and wherein each of said plurality of fuel cell stack assemblies is supported on said support plate by said first fuel supply conduit, said second fuel supply conduit, said first oxidizing agent supply conduit, and said second oxidizing agent supply conduit; and wherein said fuel cell manifold of each of said plurality of fuel cell stack assemblies comprise:

a first fuel supply boss extending radially outward from said fuel cell manifold for receiving said first fuel supply conduit;

a second fuel supply boss extending radially outward from said fuel cell manifold for receiving said second fuel supply conduit;

a first oxidizing agent supply boss extending radially outward from said fuel cell manifold for receiving said first oxidizing agent supply conduit; and a second oxidizing agent supply boss extending radially outward from said fuel cell manifold for receiving said second oxidizing agent supply conduit;

wherein said first oxidizing agent supply boss and said second oxidizing agent supply boss each include an upper oxidizing agent supply recess extending axially thereinto and a lower oxidizing agent supply recess extending axially thereinto such that said upper oxidizing agent supply recess and said lower oxidizing agent supply recess of said first oxidizing agent supply boss extend into said first oxidizing agent supply boss from opposite sides thereof and such that said upper oxidizing agent supply recess and said lower oxidizing agent supply recess of said second oxidizing agent supply boss extend into said second oxidizing agent supply boss from opposite sides thereof.

11. A heater as in claim 10 wherein:
said first oxidizing agent supply conduit comprises a plurality of first oxidizing agent supply conduit segments;
said second oxidizing agent supply conduit comprises a plurality of second oxidizing agent supply conduit segments;
said upper oxidizing agent supply recess of said first oxidizing agent supply boss receives one of said plurality of first oxidizing agent supply conduit segments therein;
said lower oxidizing agent supply recess of said first oxidizing agent supply boss receives another one of said plurality of first oxidizing agent supply conduit segments therein;
said upper oxidizing agent supply recess of said second oxidizing agent supply boss receives one of said plurality of second oxidizing agent supply conduit segments therein; and
said lower oxidizing agent supply recess of said second oxidizing agent supply boss receives another one of said plurality of second oxidizing agent supply conduit segments therein.

12. A heater as in claim 11 wherein each of said first oxidizing agent supply boss and said second oxidizing agent supply boss includes an oxidizing agent supply through passage such that said oxidizing agent supply through passage of said first oxidizing agent supply boss provides fluid communication between said one of said plurality of first oxidizing agent supply conduit segments and said another one of said plurality of first oxidizing agent supply conduit segments and such that said oxidizing agent supply through passage of said second oxidizing agent supply boss provides fluid communication between said one of said plurality of second oxidizing agent supply conduit segments and said another one of said plurality of second oxidizing agent supply conduit segments.

* * * * *